June 23, 1964      L. T. HEIN      3,137,963
PELT-DRYING FRAME
Filed April 23, 1963      2 Sheets-Sheet 1
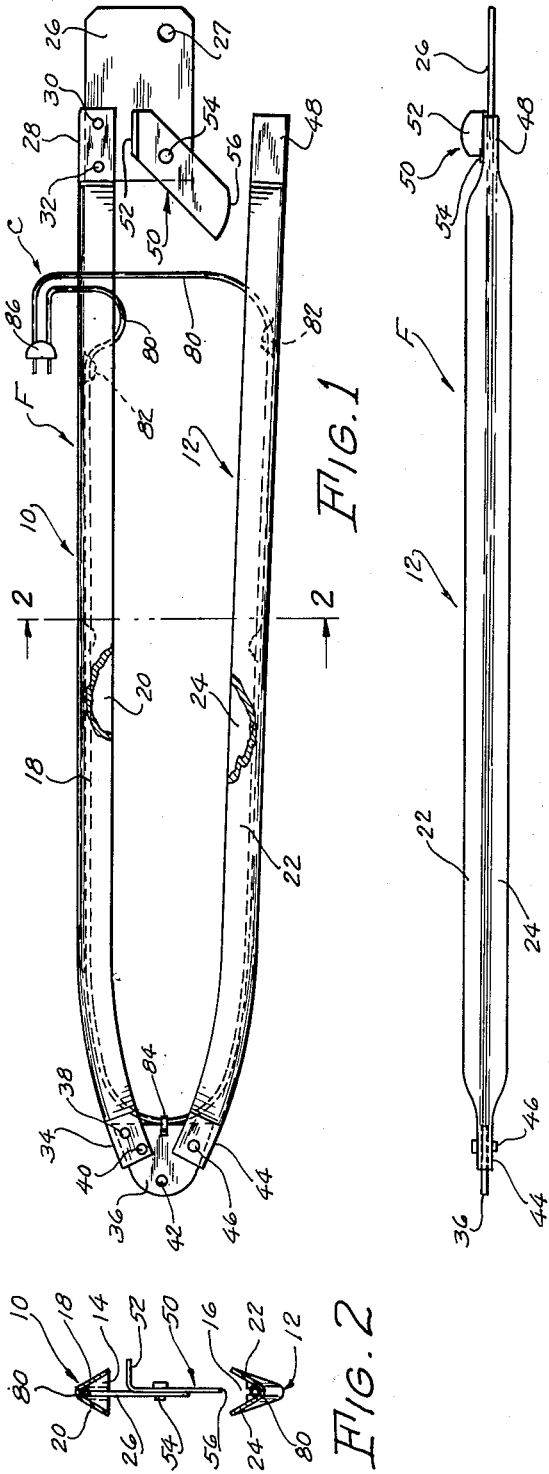
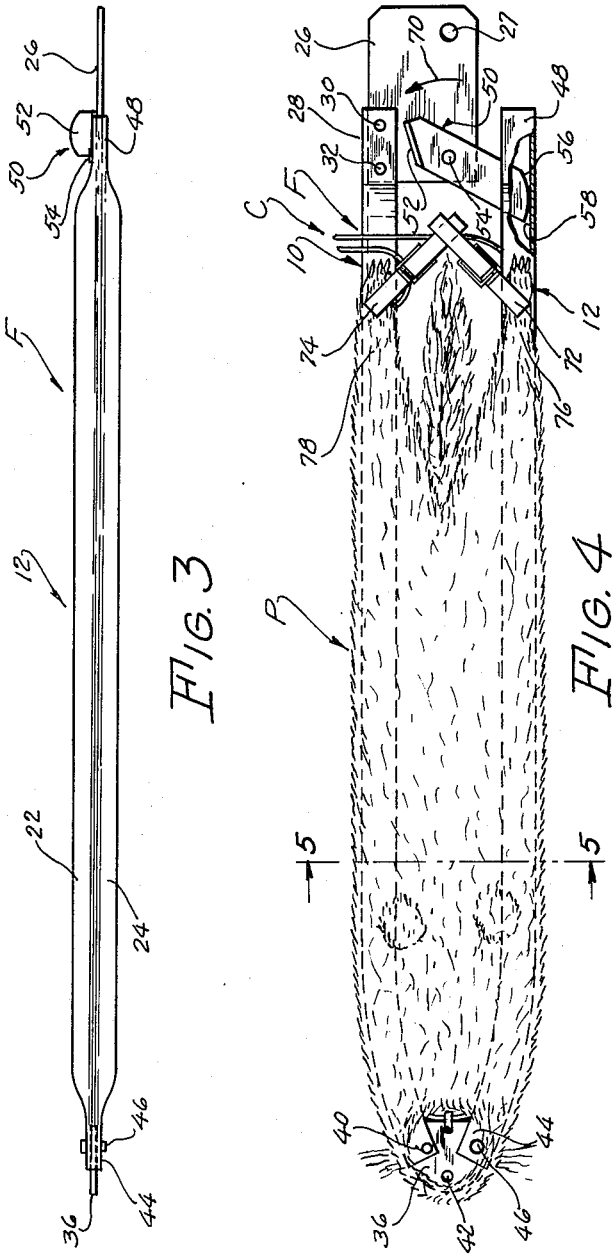
INVENTOR.
LOUIS T. HEIN

June 23, 1964  L. T. HEIN  3,137,963
PELT-DRYING FRAME
Filed April 23, 1963 2 Sheets-Sheet 2
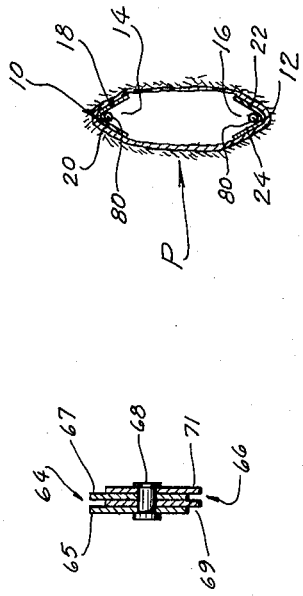
FIG. 5
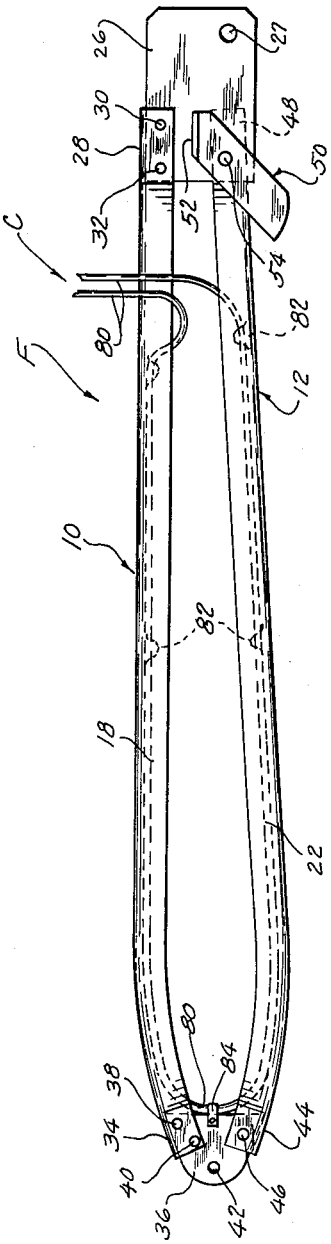
FIG. 7
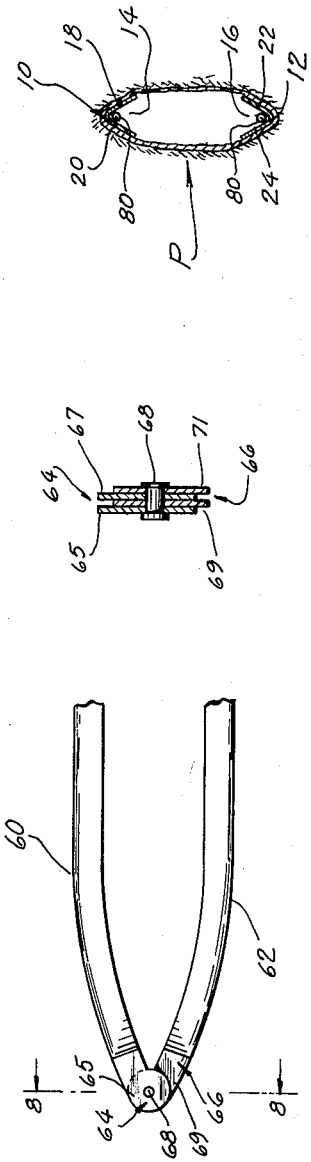
FIG. 8
FIG. 6
INVENTOR.
LOUIS T. HEIN
BY

United States Patent Office 3,137,963
Patented June 23, 1964

3,137,963
PELT-DRYING FRAME
Louis T. Hein, 3515 4-Mile Road, Racine, Wis.
Filed Apr. 23, 1963, Ser. No. 275,030
4 Claims. (Cl. 45—24)

This invention relates to dryers for animal pelts, and especially to a frame for use in hanging the pelts of mink or other small animals preparatory to drying prior to the operation of dressing the pelts.

One object of this invention is to provide a pelt-drying frame that is collapsible so as to permit the pelt to be easily slipped over the frame while in the raw condition and ready for drying, and easily removed from the frame without injuring the skin after it has dried.

Another object is to provide a pelt-drying frame that permits drying the pelt with the fur-side exposed, thus permitting thorough inspection of the pelt by a broker or fur buyer.

Another object is to provide a pelt-drying frame that is collapsible, and adjustable to the various sizes of pelts.

Another object is to provide a pelt-drying frame that assures a free circulation of air through the inside of the pelt so as to hasten the drying process.

Another object is to provide a pelt-drying frame having a convenient means for maintaining the pelt taut.

Raw mink pelts are, at the present, cured and dried by inserting a thin wood slab of the proper shape into the pelt with the flesh-side of the latter facing outwardly. The slab with the pelt thereon is then hung on a suitable rack to permit the fat to exude and to run off, and the skin to dry.

Various methods have been employed when curing and drying pelts on wood slabs in order to hasten the process, among them being to insert a tube at the lower end of the suspended pelt and blow air upwardly through the inside thereof. The wood slab, however, does not permit rapid transfer of heat to dry the portion of the pelt actually in contact with the slab and prevents air from reaching the flesh side. If the temperature is raised in order to compensate for this in order to hasten the drying process, and reaches a point higher than normal for the living animals, the skin may suffer deterioration.

One objection to curing and drying the pelt with the fur-side facing inwardly, is that a later attempt to turn the fur-side outwardly may result in tearing the pelt, considerably reducing the value thereof.

Referring to the drawing:

FIG. 1 is a broadside view of the pelt-drying frame of the invention opened and ready to receive a raw pelt.

FIG. 2 is a section taken at 2—2 of FIG. 1.

FIG. 3 is an edge view of the frame shown in FIG. 1.

FIG. 4 shows the drying frame upon which a raw pelt has been placed and ready for drying.

FIG. 5 shows a section taken at 5—5 of FIG. 4.

FIG. 6 is a fragmentary view of certain details showing an alternate design.

FIG. 7 shows the frame of FIGS. 1 and 4 in the collapsed position to permit easy mounting and removing of a pelt, and FIG. 8 is an enlarged view of a section taken at 8—8 of FIG. 6.

Referring to FIG. 1, frame F comprises a first leg 10 and a second leg 12, which legs are made of thin sheet metal, and are formed in the shape of a V cross section defining channels 14 and 16 respectively and a juncture 17, as shown in FIG. 2.

Leg 10 comprises diverging walls 18 and 20, which have an included angle between them of approximately 50 degrees. Leg 12 is formed similarly to leg 10 and comprises diverging walls 22 and 24. It will be clear that channels 14 and 16 serve to hold the opposed inside surfaces of the pelt separated so as to hasten drying of the pelt by permitting the free flow of air therethrough. The thin walls 18, 20, 22 and 24 also aid in hatsening the drying of the pelt by permitting rapid transfer of heat from within channels 14 and 16, through the walls and the portion of the pelt in contact with the walls, thus relying upon the laws of thermodynamics to provide prompt drying of the skin.

A base piece 26, of sheet metal in this instance, is secured intermediate the walls 18 and 20 and within the channel 14. The ends of walls 18 and 20 are flattened into contact with the surfaces of base piece 26 as at 28, and rivets 30 and 32 secure leg F and base piece 26 integrally. A hole 27 is provided for convenience in hanging the frame F on a suitable rack.

The lower end 34 of leg 10 has inserted within channel 14 a nose piece 36, and walls 18 and are flattened into contact with the surfaces of nose piece 36, and rivets 38 and 40 secure leg 10 and nose piece 36 integrally. It is anticipated that these details may be simplified with the omission of the nose piece 36 as shown in FIGS. 6 and 8. A hole 42 is provided in nose piece 36 for the purpose of hanging frame F from the lower end when so desired.

Leg 12 is formed so as to converge toward leg 10 at the lower end as at 44 thereof. Nose piece 36 is inserted within channel 16 at end 44, and walls 22 and 24 are flattened into contact with opposed surfaces of nose-piece 36. A pivot pin 46 is passed through wall 22, nose piece 36 and wall 24 and then riveted, permitting leg 12 to pivot freely relative to the nose piece 36. The upper end of leg 12 is flattened as at 48 to bring walls 22 and 24 into close proximity, for a purpose that will appear.

An adjustment lever 50 is pivotally mounted on base piece 26 as shown in FIG. 1, by means of a rivet pin 54. Lever 50 is formed with a finger tab 52 to provide the means to swing the lever manually when leg 12 is being adjusted to conform to the pelt being mounted for drying. Pivot pin 54 is riveted so as to provide a slight friction when adjusting lever 50 as shown in FIG. 4. Lever 50 terminates in a cam face 56 which enters the space at end 48 and between the flattened walls 22 and 24, which space is less than the thickness of lever 50, thus providing a frictional grip for the lever, as shown in FIG. 4. Cam face 56 engages the bottom of channel 16 as at 58, when a pelt has been mounted.

The modification shown in FIG. 6 comprises a pair of legs 60 and 62 of similar cross sectional design as that of legs 10 and 12. The nose piece 36, however, has been omitted. Leg 60 terminates in a bifurcated end 64 having lugs 65 and 67. Leg 62 has a bifurcated end 66 having lugs 69 and 71. Legs 60 and 62 are assembled as in FIG. 6 so that lugs 65, 69, 67 and 71 are stacked alternately as shown in FIG. 8. A pivot pin 68 is provided so that leg 62 can pivot freely relative to leg 60. The purpose of this modification is merely to eliminate the nose piece 36 if desired.

When preparing to mount a raw pelt P for drying, frame F is collapsed by flexing leg 12 out of the plane of leg 10 and swinging the former beyond base piece 26 as shown in FIG. 7, thus reducing the width of the frame, which is then inserted, nose piece first, into the pelt P as shown in FIG. 4. Leg 12 is then returned to the position to receive lever 50 which is then rotated in the direction of the arrow 70 until the pelt is taut on the frame. The friction existing between the lever 50 and the surfaces of walls 22 and 24 will serve to hold the lever in the adjusted position.

Conventional wood spring clothes pins 72 and 74 are suitable to hold the rear feet 76 and 78 of the pelt to walls 24 and 20, respectively. The frame with the pelt is then hung on a rack by means of hole 27. When the pelt has dried it is removed from the frame F by rotating lever 50 in the opposite direction to that of the arrow 70, and then moving leg 12 toward leg 10. The pelt P is then free to be withdrawn from the frame F.

It is evident that the inventor has provided a novel and useful pelt-drying frame that permits exhibiting the pelts to buyers and brokers, inasmuch as the fur-side faces outwardly. The quality and condition of the pelt is then apparent without requiring the turning of the skin inside-out, reducing the probability that the buyer will discount the price because of questionable quality.

An auxiliary means of supplying heat is provided in the form of a so-called heating cable C which comprises a high-resistance element 80 in the form of a loop as shown in FIGS. 1, 5 and 7. These cables are available in various resistances to provide, for example, heat at 60 degrees. Cable C is laid in channels 14 and 16, and a suitable cement as at 82 is applied to hold the cable in place. A clip 84 supports the cable at the nose piece 36. A plug 86 for standard current provides the means of supplying the current.

Cable C is an additional novel means of drying pelts quickly and efficiently.

Another advantage arising from the use of this novel frame is that the fur-side is out during the drying operation, there is no purpose in turning the pelt inside-out for inspection, which turning may tear the skin.

It is also evident that the collapsible feature of this frame permits removal of the dried pelt with a minimum danger of mutilating it.

This novel frame also is an improvement over the presently-used wood slabs in that the frame of the present invention permits free circulation of air through the inside of the pelt, and in addition to the heating cable, accelerates the drying process.

It is to be understood that the invention is not limited to the details disclosed, but includes all such variations and modifications as fall within the spirit of the invention.

The above being a complete description of an illustrative embodiment of the invention, what is claimed as new and desired to be secured by Letters Patent of the United States is:

1. In a pelt drying frame, in combination a first leg and a second leg spaced apart, said legs having diverging walls defining mutually-opposed channels, said legs having mutually-converging lower ends, a nose piece at said lower ends and positioned in said channels, the lower end of said first leg fixedly secured to said nose piece, said second leg pivotally secured to said nose piece, a head piece positioned in the channel of said first leg at the upper end thereof, said first leg fixedly secured to said head piece, an adjustable means pivotally secured to said head piece and engaging the bottom of said channel of said second leg to vary the distance between said legs, the upper end of said leg being formed so that said walls are substantially parallel to frictionally hold said adjustable means therebetween.

2. In a pelt-drying frame, in combination a first leg and a second leg having upper and lower ends, and mutually-opposed longitudinal channels defined by diverging walls, means to pivot said lower ends together, and adjusting means carried by the upper end of said first leg to engage said second leg intermediate said walls, and contact the apex of said channel to fix the distance between said legs.

3. In a pelt-drying frame, in combination a first leg and a second leg having mutually-opposed channels having diverging walls and upper and lower ends, means to pivot said lower ends together and pivoted adjusting means carried at the upper end of one of said legs to engage the other leg within said channel to adjust the spread between the upper ends of said legs.

4. In a pelt-drying frame, in combination a first leg and a second leg having mutually-opposed longitudinal channels having diverging walls and upper and lower ends, means to pivot said lower ends together, adjusting means carried by one of said legs to engage the other leg to adjust the spread between said legs, and a heating element positioned in said channels between said walls and having terminal means for connection to a power supply.

References Cited in the file of this patent
UNITED STATES PATENTS

| | | |
|---|---|---|
| 1,084,004 | Graver | Jan. 13, 1914 |
| 1,169,145 | Gibson | Jan. 25, 1916 |
| 1,232,059 | Long | July 3, 1917 |
| 2,163,989 | Sturtz | June 27, 1939 |
| 2,180,213 | Peake | Nov. 14, 1939 |
| 2,485,242 | Leighton | Oct. 18, 1949 |